United States Patent
Totu

(10) Patent No.: US 11,465,780 B2
(45) Date of Patent: Oct. 11, 2022

(54) SMALL-SIZE ARTIFICIAL SATELLITE—"CARD-SAT"

(71) Applicant: MAZAROM IMPEX S.R.L., Bucharest (RO)

(72) Inventor: Adrian Totu, Bucharest (RO)

(73) Assignee: MAZAROM IMPEX S.R.L., Bucharest (RO)

( * ) Notice: Subject to any disclaimer, the term of this patent is extended or adjusted under 35 U.S.C. 154(b) by 191 days.

(21) Appl. No.: 16/970,963

(22) PCT Filed: Feb. 13, 2019

(86) PCT No.: PCT/RO2019/000003
§ 371 (c)(1),
(2) Date: Aug. 19, 2020

(87) PCT Pub. No.: WO2019/160430
PCT Pub. Date: Aug. 22, 2019

(65) Prior Publication Data
US 2020/0391886 A1   Dec. 17, 2020

(30) Foreign Application Priority Data

Feb. 19, 2018   (RO) .............................. A/2018 00103

(51) Int. Cl.
*B64G 1/10*   (2006.01)
*B64G 1/22*   (2006.01)
(Continued)

(52) U.S. Cl.
CPC .............. *B64G 1/10* (2013.01); *B64G 1/222* (2013.01); *B64G 1/443* (2013.01); *B64G 1/64* (2013.01)

(58) Field of Classification Search
CPC .......... B64G 1/10; B64G 1/222; B64G 1/443; B64G 1/64; B64G 1/641; B64G 1/428;
(Continued)

(56) References Cited

U.S. PATENT DOCUMENTS 6,568,638 B1   5/2003   Capots
7,487,771 B1 *  2/2009   Eiffert .................... H02S 30/10
                                                      136/246

(Continued)

FOREIGN PATENT DOCUMENTS

CN   205675262 U   11/2016
EP   1559649 A1   8/2005
(Continued)

OTHER PUBLICATIONS

Toshiyuki Mogi et al: "Structural Design of De-orbit Mechanism Demonstration CubeSat Freedom", Transactions of the Japan Society for Aeronautical and Space Sciences, Aerospace Technology Japan, vol. 14, No. 30, Jan. 1, 2016 (Jan. 1, 2016), pp. 61-68, XP55594803, DOI: 10.2322/tastj.14.Pf 61.

(Continued)

*Primary Examiner* — Medhat Badawi
*Assistant Examiner* — Vicente Rodriguez
(74) *Attorney, Agent, or Firm* — Gabriela B. Tomescu, Esq.

(57) ABSTRACT

Artificial satellite "Card-Sat" comprising a frame (1), an upper cover (2) and a lower cover (3), both covers (2, 3) being fixed to the frame (1), the frame (1), the upper cover (2) and the lower cover (3) defining a substantially paralel-epipedic chamber (5), the satellite further comprising solar cells (6) fixed to the outer surface, in respect to the chamber (5), of the upper cover (2) and of the lower cover (3), and an avionics system (7), integrated on the inner surface, in respect to the chamber (5), of at least one of the upper cover (2) or the lower cover (3).

13 Claims, 4 Drawing Sheets

Figure 1:
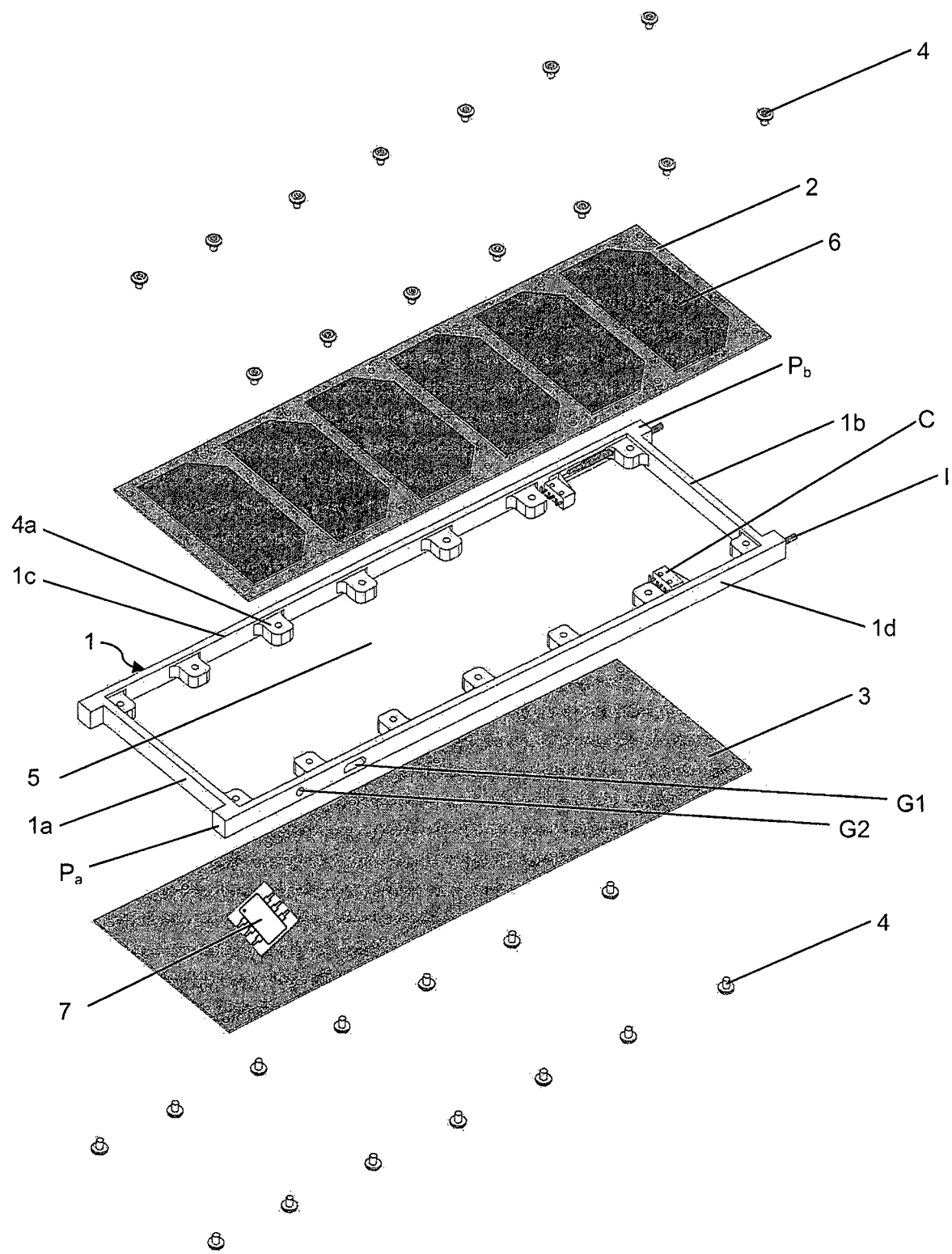

(51) Int. Cl.
*B64G 1/44* (2006.01)
*B64G 1/64* (2006.01)

(58) Field of Classification Search
CPC .. B64G 1/1085; B64G 1/1078; B64G 1/1021; B64G 1/1007
See application file for complete search history.

(56) References Cited

U.S. PATENT DOCUMENTS

| | | | |
|---|---|---|---|
| 9,444,394 B1* | 9/2016 | Thomas | H02S 20/30 |
| 10,745,152 B2* | 8/2020 | Spangelo | B64G 1/443 |
| 2006/0185277 A1* | 8/2006 | Quincieu | B64G 1/10 52/265 |
| 2014/0039729 A1 | 2/2014 | Jordi et al. | |
| 2017/0320597 A1* | 11/2017 | Lim | B64G 1/641 |
| 2018/0111707 A1* | 4/2018 | Poncet | B64G 1/645 |

FOREIGN PATENT DOCUMENTS

| | | | |
|---|---|---|---|
| EP | 3254973 A1 | 12/2017 | |
| EP | 3339188 A1 | 6/2018 | |

OTHER PUBLICATIONS

Dr. C. Underwood, Dr. G. Richardson, J Savignol. A Low Cost Modular COTS-Based Nano-Satellite—Design, Construction, Launch and Early Operations Phase by Surrey Satellite Technology Limited University of Surrey, Guildford, England, Surrey Space Centre University of Surrey, Guildford, England.

* cited by examiner

SMALL-SIZE ARTIFICIAL SATELLITE—"CARD-SAT"

The invention relates to a small-size satellite and to an assembly consisting of a plurality of such small-size satellites.

A miniature satellite is a satellite weighing less than 500 kg. A class of miniature satellites are the nano-satellites, that weigh between 1 to 10 kg. The satellite according to the invention belongs to the nano-satellites class.

One of the most successful nano-satellites currently known is the CubeSat, developed since 1999 by professors Jordi Puig-Suari (California Polytechnic State University) and Bob Twiggs (Stanford University), in order to provide universities and manufacturers with an affordable solution (in terms of cost and feasibility) for implementing a simple space mission.

CubeSat embodiments are known, for example, from its design standards (CubeSat Design Specification Rev13— http://www.cubesat.org) or from patent application US2014/0039729A1.

A CubeSat satellite (in short—CubeSat) comprises a chassis and an avionics system arranged within the chassis.

Avionics system (or in short—avionics) means all the electrical and electronic systems with which the artificial satellite is provided, such as the power source, the on-board computer, the radio transceiver-telemetry module, the guidance system, the data acquisition and processing module for the data provided by the sensors, etc.

The CubeSat satellite avionics includes a set of electronic boards interconnected via connectors. Said set of boards may include, for example, a payload interface board, at least one secondary board and a battery board. All said boards are arranged in parallel planes.

The smallest CubeSat, considered as one CubeSat unit, is a cube with a side of 10 cm and a maximum weight of 1.33 kg. Such a CubeSat is also called 1U CubeSat (1U=one unit).

The CubeSat has standardized dimensions, the standard providing CubeSat satellite sizes bigger than 1U, i.e. 2U (10 cm×10 cm×20 cm), 3U (10 cm×10 cm×30 cm) or 6U (10 cm×20 cm×30 cm), the latter being also called 6U Cubesat (because it has a volume of 6 combined units).

Although it enjoys a real success, CubeSat has also some disadvantages, such as:
- although relatively small in size, the gauge is still significant (in the satellites field, each extra cm$^3$ or gramme that needs to be placed in orbit has a negative impact on costs);
- the solar energy collecting system (by means of solar panels provided outside the chassis) is not an optimal one, although satellites with expandable solar panels have been developed.

The technical problem solved by the present invention is providing a satellite with small size and weight, capable to maximize the solar energy collected by means of the solar panels, maximizing the ratio between the solar exposure area and the mass.

The satellite according to the invention is of the thin panel type, the minimum dimensions thereof being, preferably, 113.5 mm length×100 mm width×9 mm thickness. Since the reduced dimensions and the flattened shape suggest a card, in the present description we shall refer to the satellite according to the invention under the name of "Card-Sat".

A "Card-Sat" artificial satellite according to the invention comprises:

- a frame consisting of four walls, wherein each wall has a planar shape, is perpendicular to the neighboring walls, has a common side respectively with each of the neighboring walls, and is parallel to the opposite wall, wherein the first and the second wall, that are parallel and opposite to each other, are each respectively provided with two projections arranged in the extensions of the third wall and of the fourth wall,
- an upper cover and a lower cover, both covers having a planar shape, being parallel to each another and fixed to the frame with fastening means, wherein the frame, the upper cover and the lower cover define a substantially parallelepipedic chamber,
- a switch fixed to the inner surface, in respect to the chamber, of each of the third wall and of the fourth wall, wherein each switch is capable to be actuated by an associated pusher, each pusher consisting of a rod passing through an associated projection of the second wall, wherein a first end of the pusher is in contact, in a detachable manner, with the switch, and a second end of the pusher is free outside the chamber, wherein the two pairs switch-pusher form an assembly capable to detect the separation of the satellite from a satellite launcher,
- solar cells fixed to the outer surface, in respect to the chamber, respectively of the upper cover and the lower cover,
- an avionics system, integrated on the inner surface, in respect to the chamber, of at least one of the upper cover or the lower cover,
- a first through hole and a second through hole, provided, preferably, in the fourth wall, the first through hole being suitable for the passing of a communication port capable to connect the avionics system to a computer, and the second through hole being suitable for the passing of a pin.

The prior art CubeSat satellite, in addition to the plurality of boards incorporating electrical and electronic components, also includes covers (namely six) that have the exclusive purposes of protecting the interior of the satellite and of supporting the solar cells situated on the outer side of the covers.

Unlike CubeSat, the "Card-Sat" satellite according to the invention may be a "one board satellite—OBS" type when all electrical and electronic components (such as the avionics system) are integrated on only one of the satellite's upper or lower covers. This embodiment confers a substantial space saving and a simplification of the satellite's architecture.

The satellite according to the invention has the following advantages:
- it is designed to perform the same functions as a CubeSat, but in a much smaller volume (up to 11 times smaller)
- the solar energy collecting system is further optimized;
- a plurality of satellites according to the invention can be connected to each other in a simple manner, so as to form a satellites assembly that maintain their ability to maximize the collected solar energy.

Figure 2:
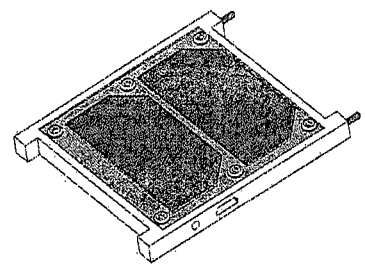
Figure 3:
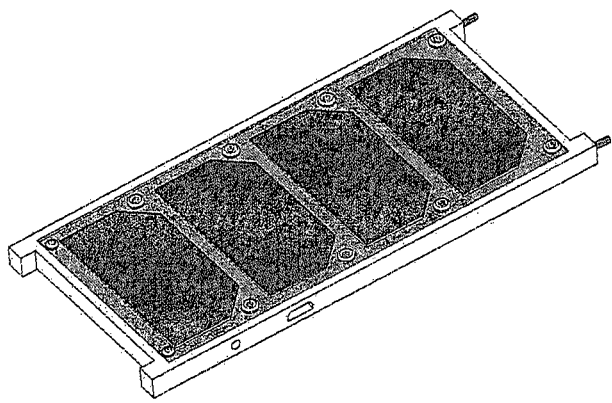
Figure 4:
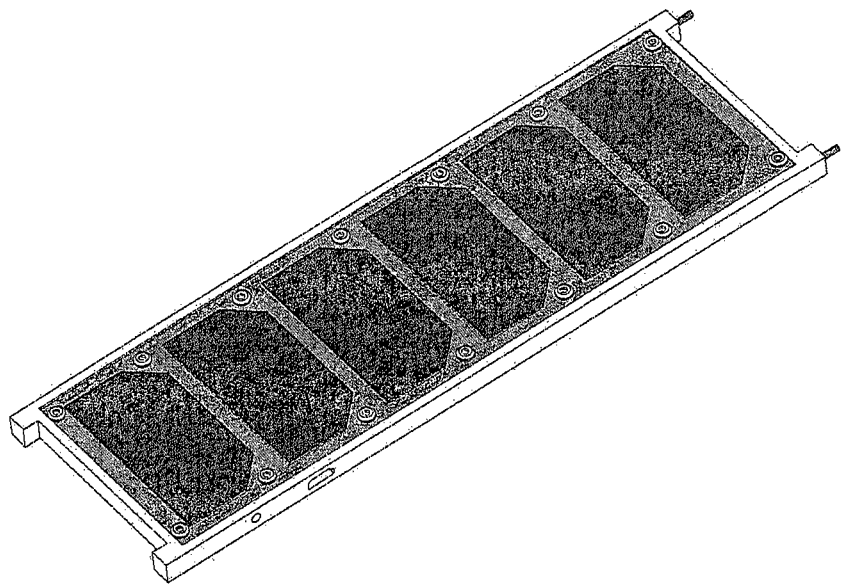
Figure 5:
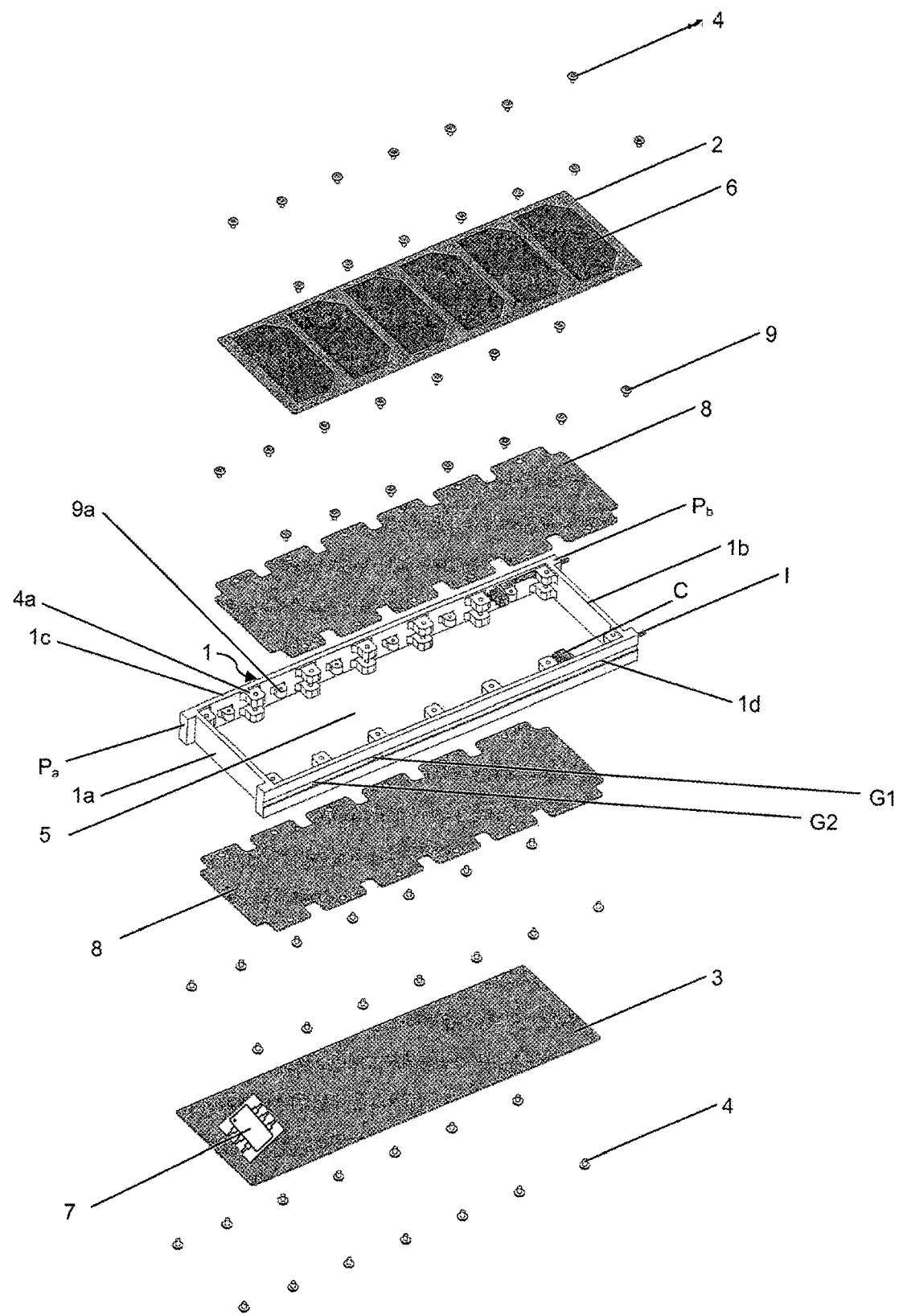
Figure 6:
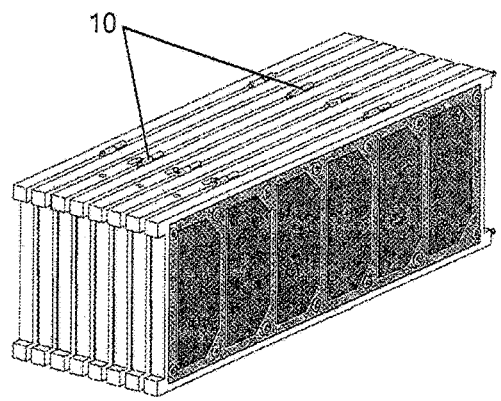
Figure 7:
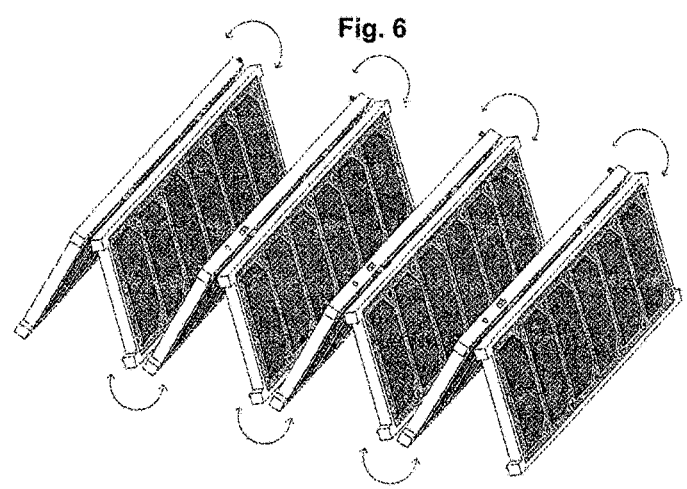
Figure 8:
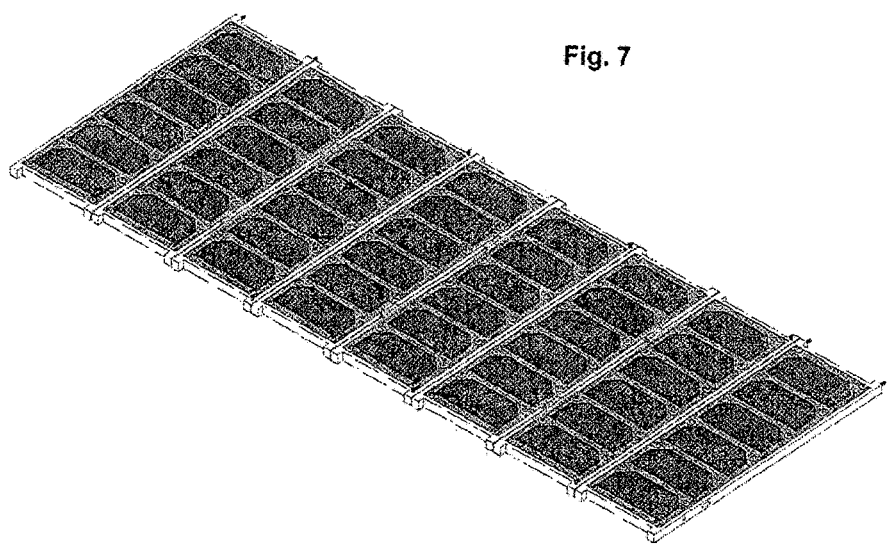

The following non-limiting embodiments of a satellite according to the invention relate to FIGS. 1-8, representing:

FIG. 1: exploded view of the satellite according to the invention—a first embodiment, FIG. 2, FIG. 3, FIG. 4: views of the satellite according to the invention, respectively in three dimensional alternatives, FIG. 5: exploded view of the satellite according to the invention—a second embodiment, FIG. 6, FIG. 7, FIG. 8: views of an satellites assembly according to the invention, respectively in a retracted, an intermediate and an extended configuration.

FIG. 1 shows a "Card-Sat" artificial satellite according to the invention, comprising:
- a frame 1 consisting of four walls 1a, 1b, 1c, 1d, wherein each wall has a planar shape, is perpendicular to the neighboring walls, has a common side respectively with each of the neighboring walls, is parallel to the opposite wall, wherein the first wall 1a and the second wall 1b, that are parallel and opposite to each other, are each respectively provided with two projections $P_a$, $P_b$ arranged in the extensions of the third wall and of the fourth wall,
- an upper cover 2 and a lower cover 3, both covers 2, 3 having a planar shape, being parallel to each another and fixed to the frame 1 with fastening means 4, wherein the frame 1, the upper cover 2 and the lower cover 3 define a substantially parallelepipedic chamber 5,
- a switch C fixed to the inner surface, in respect to the chamber 5, of each of the third wall 1c and of the fourth wall 1d, each switch C being capable to be actuated by an associated pusher I, each pusher I consisting of a rod passing through an associated projection $P_b$ of the second wall 1b, wherein a first end of the pusher I is in contact, in a detachable manner, with the switch C, and a second end of the pusher I is free outside the chamber 5, wherein the two pairs switch C—pusher I form an assembly capable to detect the separation of the satellite from a satellite launcher,
- solar cells 6 fixed to the outer surface, in respect to the chamber 5, respectively of the upper cover 2 and the lower cover 3,
- an avionics system 7, integrated on the inner surface, in respect to the chamber 5, of at least one of the upper cover 2 or the lower cover 3,
- a first through hole G1 and a second through hole G2, provided, preferably, in the fourth wall 1d, the first through hole G1 being suitable for the passing of a communication port capable to connect the avionics system 7 to a computer, and the second through hole G2 being suitable for the passing of a pin.

The connection of the avionics system 7 to a computer via a communication port is made in the purpose of programming the satellite.

Said pin is not a part of the satellite, but initially it is connected to the satellite, being introduced through the hole G2 such that one end thereof contacts a receiving element of the avionics system 7, and the other end thereof remains free outside the satellite. As long as the satellite is in the preparation phase for the space mission (for example in the programming phase of the satellite), the pin remains connected within the receiving element.

After completing the satellite preparation for the mission, just before the satellite is placed in the satellite launcher, the pin is disconnected from the satellite (by grasping the free end of the pin, disconnecting it from the receiving element and extracting the pin, through the hole G2, completely outside the satellite).

The extraction of the pin (disconnecting it from the satellite) signals the satellite that the space mission has begun and consequently determines the start of the avionics system.

The avionics system of the satellite according to the invention comprises, for example, a power source powered by the solar cells, an on-board computer, a radio transceiver-telemetry module, a guidance system and a data acquisition and processing module for the data provided by the satellite's sensors. Depending on the mission's purpose, the avionics system may also include other components.

The frame 1 is preferably manufactured from one of the following materials: metal (preferably aluminum), composite material, ceramic material, carbon fiber, PEEK (polyether ether ketone).

The fastening means 4 are, preferably, screws that can be screwed into protuberances 4a provided on the inner surfaces, in respect to the chamber 5, of the walls 1a, 1b, 1c, 1d of the frame 1.

The solar cells 6 preferably cover a surface between 70-90% of the outer surface, in respect to the chamber 5, of the upper cover 2 and of the lower cover 3.

In a second embodiment of the "Card-Sat" artificial satellite according to the invention, the avionics system 7 is further integrated on at least one board 8 arranged inside the chamber 5 between the upper cover 2 and the lower cover 3, and parallel to covers 2 and 3.

FIG. 5 shows an exploded view of the satellite according to the invention, of the second embodiment, in which the avionics system is further integrated on two boards 8. In practice, more than two boards 8 may exist.

Besides to the two boards 8, the second embodiment of FIG. 5 further comprises, in respect to the first embodiment of FIG. 1, additional screws 9 for fastening the boards 8, and which may be screwed into additional protuberances 9a provided on the inner surfaces, in respect to the chamber 5, of the third wall 1c and of the fourth wall 1d.

The boards 8 are provided with cutouts on their contour, corresponding to the positions of the protuberances 4a on the third wall 1c and on the fourth wall 1d, said cutouts allowing the insertion of the boards 8 in the chamber 5.

The covers 2, 3 and the boards 8 are connected to each other by means of data connectors (not shown, in order to simplify the drawing).

The minimum dimensions of the satellite according to the invention are dictated by the complexity of the avionics system and by the amount of solar energy to be collected.

It is preferable the size range to be relatively small, so that if the need for standardization arises in the future, said standardization will not be very sophisticated.

Thus, irrespective of the embodiment, we propose (without limiting the present invention in terms of dimensions) that the minimum dimensions of the "Card-Sat" satellite according to the invention to be about 113.5 mm length×100 mm width×9 mm thickness.

If we name these minimum dimensions "1U Card-Sat", the satellite according to the first embodiment may have, for example, the dimensions 227 mm length×100 mm width×9 mm thickness (named "2U Card-Sat") or 340.5 mm length× 100 mm width×9 mm thickness (named "3U Card-Sat").

Practically, depending on the needs, in the first embodiment the length of the satellite may vary, keeping constant both width and thickness.

FIGS. 2, 3 and 4 show satellite views according to the first embodiment respectively for 1U Card-Sat, 2U Card-Sat and 3U Card-Sat.

The satellite according to the second embodiment may have, for example, the dimensions between about 113.5 mm length×100 mm width×9 mm thickness and about 340.5 mm length×100 mm width×22 mm thickness.

Similarly, in this case also we shall name "2U Card-Sat" the satellites with a length of 227 mm and "3U Card-Sat" the satellites with a length of 340.5 mm.

Practically, depending on the needs, in the second embodiment both the length and the thickness of the satellite may vary, only the width being kept constant. The thickness of the satellite depends on the number of boards 8.

In both first and second embodiments according to the invention, the length of the projections $P_a$ on the first wall $1a$ is approximately 6.5 mm and the length of the projections $P_b$ on the second wall $1b$ is about 7 mm.

The projections $P_a$ serve as support elements for the satellite when the satellite is inside the satellite launcher, and due to their shape and size they protect the content of the satellite against possible shocks.

The projections $P_b$ serve as support elements for the satellite when the satellite is inside the satellite launcher (and due to their shape and size they protect the content of the satellite against possible shocks) and they also serve to guide a pushing system for the separation, during launch, of the satellite from the satellite launcher.

Regardless of the embodiment, the satellite according to the invention can be used both individually or as part of an assembly of identical satellites.

When it is intended to be part of an assembly of identical satellites, the satellite according to the invention is further provided with joints 10 on the outer surfaces, in respect to the chamber 5, of the third wall $1c$ and/or of the fourth wall $1d$ (FIGS. 6, 7, 8).

The satellites assembly consists of a plurality of individual satellites, each of the satellites being connected to the neighboring satellite/satellites by means the joints 10.

The satellites assembly is able to adopt, by means of the joints 10:
- either a first extreme configuration, also named a retracted configuration, in which the surfaces of the covers 2, 3 of all the satellites of the assembly are parallel to one another;
- either a second extreme configuration, also named an extended configuration, in which the surfaces of the upper covers 2 of all the satellites of the assembly are substantially coplanar and the surfaces of the lower covers 3 of all the satellites of the assembly are also substantially coplanar;
- either any intermediate configuration between the two extreme configurations.

Practically, the satellites assembly is initially introduced, in retracted configuration, inside the satellite launcher. Once released in space (after leaving the satellite launcher), the satellites assembly is programmed or is controlled to gradually modify its configuration, adopting successive intermediate configurations until it reaches the extended configuration. The satellites assembly remains in the extended configuration for the entire duration of the space mission.

Regardless of the case (individual satellite or satellites assembly), the collecting of the solar energy is optimized to the maximum, because the positioning of the satellite/assembly is carried out extremely easy, so that the sun's rays are constantly perpendicular to the surface of the solar cells belonging to the sun-facing cover.

In the CubeSat case, the optimization of solar energy collecting is difficult, if not impossible, because during satellite operation the satellite is oriented with three of its faces towards the sun, the angle of incidence of the sun's rays being different for each face.

The invention claimed is:

1. An artificial satellite "Card-Sat" comprising:
a frame consisting of four walls, wherein
each wall
    has a planar shape,
    is perpendicular to neighbouring walls,
    has a common side respectively with each of the neighbouring walls,
    is parallel to an opposite wall, and
wherein a first wall and a second wall, that are parallel and opposite to each other, are
    each respectively provided with two projections arranged in the extensions of a third wall and of a fourth wall,
an upper cover and a lower cover, both covers having a planar shape, are parallel to each other and fixed to the frame with fastening means, wherein the frame, the upper cover and the lower cover define a substantially parallelepipedic chamber,
an avionics system,
a first through hole and a second through hole, provided in the fourth wall,
    the first through hole is suitable for the passing of a communication port capable to connect an avionics system to a computer,
    and the second through hole is suitable for the passing of a pin,
a switch fixed on an inner surface, in respect to the chamber, of each of the third wall and of the fourth wall,
    each switch is capable to be actuated by an associated pusher,
    each pusher consisting of a rod passing through an associated projection of the second wall, wherein
    a first end of the pusher is in contact, in a detachable manner, with the switch,
    a second end of the pusher is free outside the chamber,
    and wherein two devices are capable to detect the separation of the satellite from a satellite launcher, each device comprising one switch and one associated pusher,
solar cells fixed to an outer surface respectively of the upper cover and the lower cover, wherein
    the "Card-Sat" satellite is of a thin panel type, with a flattened shape, and having a thickness substantially equal to the sum of the thicknesses of the frame, of the upper cover and of the lower cover, and
    the avionics system is integrated on an inner surface of at least one of the upper cover or the lower cover.

2. The satellite according to claim 1, wherein the avionics system comprises a power source powered by solar cells, an on-board computer, a radio transceiver-telemetry module, a guidance system and a data acquisition and processing module for data provided by the satellite's sensors.

3. The satellite according to claim 1, wherein the frame is made of one of the following materials: a metal, a composite material, a ceramic material, carbon fibre, PEEK (polyether ether ketone).

4. The satellite according to claim 1, wherein the fastening means are screws that are screwed in protuberances provided on the inner surfaces of the walls.

5. The satellite according to claim 1, wherein the solar cells cover an area between 70-90% of the outer surface of the upper cover and of the lower cover.

6. The satellite according to claim 1, wherein the avionics system is further integrated on at least one board arranged inside the chamber, between the upper cover and the lower cover and parallel to said covers.

7. The satellite according to claim 6, wherein the at least one board is fixed with additional screws that are screwed in additional protuberances provided on the inner surfaces of the third wall and of the fourth wall.

8. The satellite according to claim 1, wherein dimensions of the satellite range between about 113.5 mm length×100 mm width×9 mm thickness and about 340.5 mm length×100 mm width×9 mm thickness.

9. The satellite according to claim 6, wherein the dimensions of the satellite range between about 113.5 mm length×

100 mm width×9 mm thickness and about 340.5 mm length× 100 mm width×22 mm thickness.

10. The satellite according to claim 1, wherein a length of the projections on the first wall is about 6.5 mm and thea length of the projections on the second wall is about 7 mm.

11. The satellite according to claim 1, wherein said satellite is provided with joints on the outer surfaces of the third wall and/or respectively of the fourth wall.

12. A satellites assembly, wherein the assembly comprises a plurality of identical satellites according to claim 11, each of said satellites is connected to a neighbouring satellite/satellites by means of the joints.

13. The satellites assembly according to claim 12, wherein the assembly is capable to adopt, by means of the joints one of the following:
- a first extreme configuration in which the surfaces of the covers of all the satellites of the assembly are parallel to one another;
- a second extreme configuration in which the surfaces of the upper covers of all the satellites of the assembly are substantially coplanar and the surfaces of the lower covers of all the satellites of the assembly are also substantially coplanar; or
- any intermediate configuration between the first and the second extreme configurations.

* * * * *